United States Patent
Barnes et al.

[11] Patent Number: 5,148,873
[45] Date of Patent: Sep. 22, 1992

[54] ROW FOLLOWER

[75] Inventors: Ronny L. Barnes, O'Donnell; Jimmy C. Ray, Denison, both of Tex.

[73] Assignee: Gar-Bar Corporation, O'Donnell, Tex.

[21] Appl. No.: 664,632

[22] Filed: Mar. 4, 1991

[51] Int. Cl.$^5$ ............................................. A01B 69/00
[52] U.S. Cl. ..................................... 172/5; 172/26; 104/244.1; 180/131
[58] Field of Search .................... 172/5, 6, 26; 171/9; 180/79, 131; 280/776; 104/244.1

[56] References Cited

U.S. PATENT DOCUMENTS

| | | | |
|---|---|---|---|
| 3,931,774 | 1/1976 | Bradley | 172/5 X |
| 4,228,860 | 10/1980 | Orthman | 172/26 |
| 4,414,903 | 11/1983 | Fasse et al. | 172/26 X |
| 4,463,811 | 8/1984 | Winter | 172/5 X |
| 4,607,716 | 8/1986 | Beck | 172/6 X |

FOREIGN PATENT DOCUMENTS

| | | | |
|---|---|---|---|
| 2632484 | 12/1989 | France | 172/5 |
| 363442 | 3/1973 | U.S.S.R. | 172/5 |
| 1340614 | 9/1987 | U.S.S.R. | 172/26 |

OTHER PUBLICATIONS

"The Guide," Owner's Guide and Parts List, Lincoln Creek Mfg., Feb. 1989.
"Navigator-#1 in Row Crop Guidance" Sales Brochure, HR Mfg., Feb. 1991.
"Navigator", Operator's Manual & Parts guide, HR Mfg., 1989, pp. 16 and 38-40.
"The Guide, " Sales brochure, Lincoln Creek Mfg., Feb. 1988.
"Freedom Drive" Sales Brochure, Pathfinder Systems, Inc., Sep. 1989.

*Primary Examiner*—David H. Corbin
*Assistant Examiner*—Jeffrey L. Thompson
*Attorney, Agent, or Firm*—Wendell Coffee

[57] ABSTRACT

A sensor used to sense a path in a cultivated field is attached to a tractor. The sensor is stabilized to prevent the sensor from bouncing. The stabilizer may take the form of a coulter. In other cases the sensor and the stabilizer may be combined in the form of a heavy, massive sensor. The preferred form of the stabilizer is a flexible drag strip behind the sensor. A roller chain forms a suitable drag strip.

6 Claims, 2 Drawing Sheets

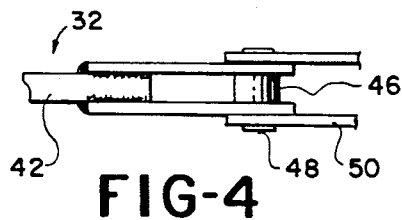
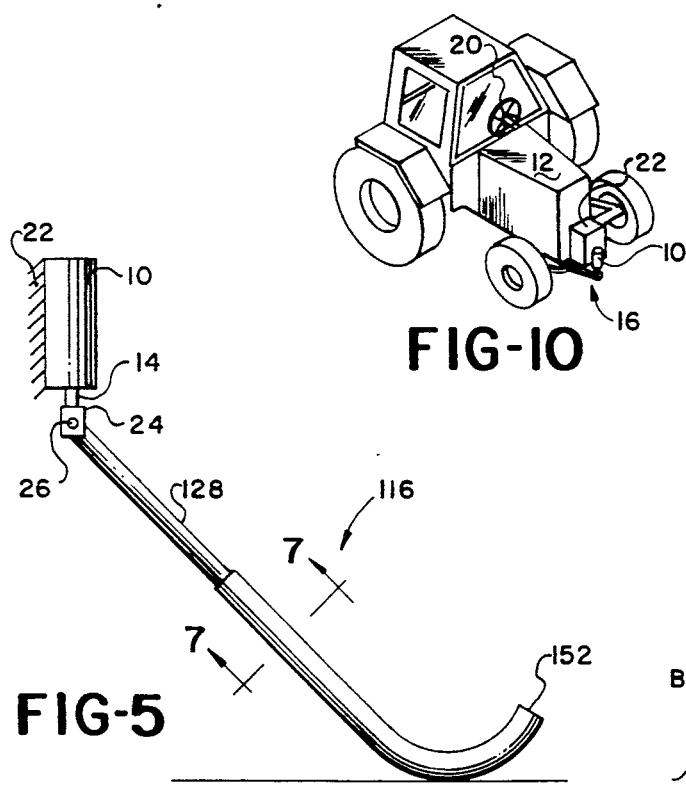
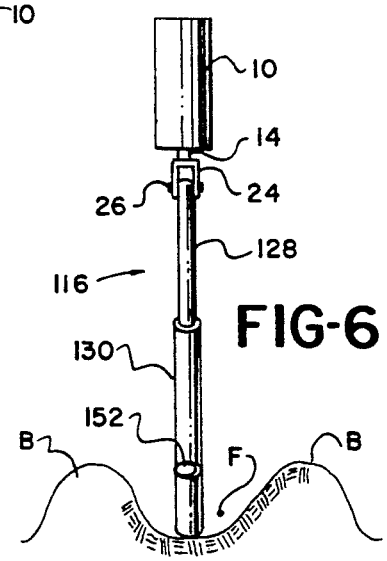
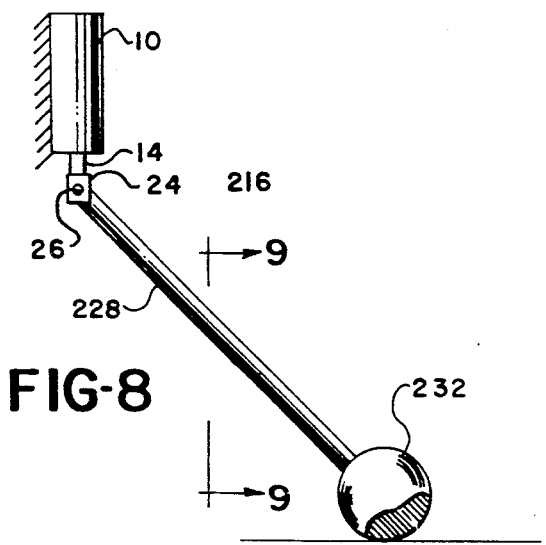
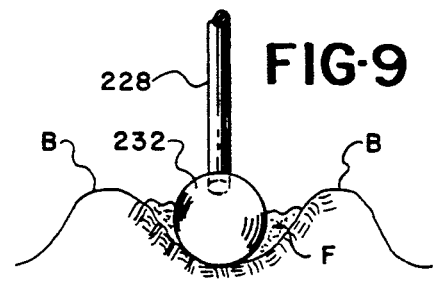

ROW FOLLOWER

CROSS REFERENCE TO RELATED APPLICATION

None, however, Applicant filed Disclosure Document Number 243,120 on Jan. 11, 1990 which document concerns this application; therefore, by separate paper it is respectfully requested that the document be retained and acknowledgment thereof made by the Examiner. (MoPEP 1706)

RIGHTS TO INVENTIONS UNDER FEDERAL RESEARCH

There was no federally sponsored research and development concerning this invention.

BACKGROUND OF THE INVENTION (1) Field of the Invention

This invention relates to a guidance system for agricultural tractors and more particularly to that part of the system which senses the path along the land which the tractor is to follow. Farmers raising row crops are those having ordinary skill in the art.

(2) Description of the Related Art

Tractor guidance systems have been developed over a long period of time. This development shows that generally there are three elements to a guidance system for a tractor. These might be broken down to (1) path sensors; (2) deviation detectors which measure the deviation as sensed by the sensor; and (3) steering means to guide the tractor responsive to the detected deviation.

This particular patent application relates to the path sensor.

As used in this application, "path" means the line or row on the land that the tractor is to follow. "Path" might also be considered a track or trail or a course that the tractor is to follow. At all times, "path" as used in this application, will mean a course on the land having at least one structural guide which may be mechanically sensed. Often the guide will be a furrow. At other times the guide will be a row of stalks. Other times, the guide might be the bed between furrows.

When this structural guide is a furrow; the furrow can be mechanically sensed by a furrow follower.

When a bed is the structural guide; the bed might be followed by a structure similar to, but opposite to a furrow follower.

The guide might be a row of stalks. This is often the case when the agricultural operation is cultivation of an established crop having stalks with sufficient structural strength to withstand feelers against them. Of most importance, when harvesting cotton, it is desirable for the harvester to follow the row of stalks as exactly as possible.

The following U.S. patents show examples of path sensors:

| | |
| --- | --- |
| KNIGHT | 1,868,360 |
| ROBERSON ET AL | 3,402,784 |
| CLEVELAND | 3,611,286 |
| BRUM | 4,366,756 |
| FASSE | 4,406,232 |
| BECK | 4,607,716 |
| STIFF ET AL | 4,367,802 |
| COLLAGAN ET AL | 4,180,133 |

KNIGHT, illustrates a row follower having a sensor as shown by the numeral 8 in that patent.

ROBERSON has a furrow follower illustrated by the numeral 25 or 26.

CLEVELAND, discloses a spherical shape or ball 44 supported by a helical spring 38 used as a furrow follower.

BRUM, discloses a furrow follower in the form of a wheel or disk 4.

FASSE, discloses a furrow follower or a pair of furrow followers such as 24 and 54. Also, FASSE et al, discloses and seeks correction for one of the problems encountered, that is, the problem of obstruction or a discontinuity of the path represented by a pile of dirt 57 within the path. The result of the problem encountered by FASSE is called herein "bounce". It might be considered a recoil or an elastic movement or a kick. However, it is to be understood that the bounce is not limited to a vertical direction. Particularly when different types of row followers are being used and a wider furrow than a sharply defined V-furrow as shown by FASSE is present, the bounce might be lateral. FASSE's solution to this problem is to provide two drags so that one is always in the furrow.

BECK, discloses a shoe-like furrow follower 56. The BECK disclosure is particularly instructive in showing a furrow which has a flat bottom. The bottom in FIG. 2 of the BECK drawings which of course presents a path more difficult in following than a sharply defined V-shaped furrow as illustrated in FASSE or CLEVELAND.

STIFF et al, discloses two co-axial disks separated apart to follow a furrow.

COLLAGAN et al, discloses a non-spherical ball-like furrow follower.

The design of row followers would not be particularly difficult if all of the paths were uniform. I.e., if the furrows were V-shaped without irregularities or weeds or clods of dirt therein, and the tractor was traveling slowly, many different row followers would be satisfactory. Likewise if the stalks of a row of crop were closely spaced, and in good alignment without irregularities, there would be no problem in having a "wand" or other feeler to follow the crop row. However, it is often desirable to travel at higher speeds, and there are clods in furrows, as well as sometimes clods along side a row of crop. The stalks often have skips or gaps therein and also irregularly spaced stalks or weeds to one side which deflect or "bounce" the sensor.

SUMMARY OF THE INVENTION (1) Progressive Contribution to the Art

According to this invention, it has been found that path sensors or tractor guidance systems operate much better if there is a stabilization thereto. One type of stabilizer might be mass (commonly called weight) alone.

We have found for example, a sixteen pound shot-put about 5" in diameter welded to the end of a rigid leg follows a furrow quite well.

Wands are often used to bear against a row of stalks. It has been found that a drag behind the wand stabilizes the wand. The drag is constructed so that it is flexible in the vertical direction, but is rigid in the horizontal direction. For example, it has been found that about one foot of ASA #50 roller chains attached to the end of the legs of wands stabilize the wands.

Obviously, with any stabilization a balance must be made between stability and sensitivity. I.e., it is desirable to maintain the row follower in a straight line in case of incidental deviations, but it is also desirable that the sensor be sensitive so that it follows the row when genuine deviations occur. In the case of the shot-put furrow follower, the mass of shot-put is sufficient to keep it in the furrow. If there is a well defined furrow the mass of the shot-put does not prevent it from following genuine deviations. I.e., the earth forming the sides of the furrow will move the shot-put laterally, if needed. However, the very mass of the shot-put measured by 16 pounds of weight is such that incidental clods, dirt, or weeds, do not cause it to deviate from its otherwise straight line.

In the case of stalks, the mass of a shot put would be so great that it would tend to crush or flex the stalks, therefore it would be inappropriate for use in such a case. In this case the chains will normally be sufficient to prevent deviation from weeds or clods, or the like, but still they will not overpower or crush the stalks and be sensitive thereto, nor will it prevent the sensitivity when the continuing row of stalks do show a deviation.

Of course other forms of stabilizer maybe used. For example, a coulter, either rotating or non-rotating may be attached to the wand of a row follower to cause it to continue in a straight line and reduce bounce, particularly horizontal bounce.

(2) Objects of this Invention

An object of this invention is to sense a path and to guide a tractor along said path, and to detect deviations when the tractor deviates from the path.

Further objects are to achieve the above with devices that are sturdy, compact, durable, lightweight, simple, safe, efficient, versatile, ecologically compatible, energy conserving, and reliable, yet inexpensive and easy to manufacture, install, and maintain.

Other objects are to achieve the above with a method that is rapid, versatile, ecologically compatible, energy conserving, efficient, and inexpensive, and does not require highly skilled people to install, operate, and maintain.

The specific nature of the invention, as well as other objects, uses, and advantages thereof, will clearly appear from the following description and from the accompanying drawings, the different views of which are not necessarily scale drawings.

BRIEF DESCRIPTION OF THE DRAWINGS

FIG. 4 is a top plan detail of attaching the stabilizer chain to the rear of the drag of the sensor of FIG. 1.

FIG. 5 is a side elevational view of a second embodiment of a sensor.

FIG. 6 is a rear elevational view of the sensor of FIG. 5.

FIG. 7 is a sectional view taken substantially on line 7—7 of FIG. 5 showing details of construction.

FIG. 8 is an elevational view of a third sensor.

FIG. 9 is a rear elevational view of the embodiment shown in FIG. 8.

FIG. 10 is a schematic representation of a tractor with the steering means and sensor.

Figure 1:
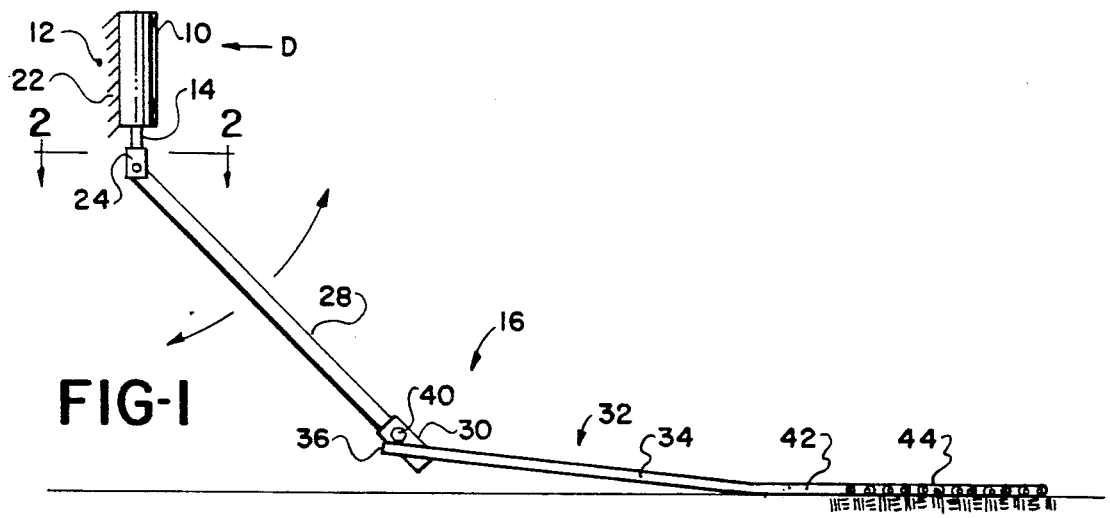
FIG. 1 is a side elevational view somewhat schematic in nature showing a sensor attached by an encoder to a tractor.

As an aid to correlating the terms of the claims to the exemplary drawings, the following catalog of elements is provided:

| ** | |
|---|---|
| 10 encoder | 46 roller |
| 12 tractor | 48 pin |
| 14 shaft | 50 link |
| 16 sensor | 152 terminal end |
| 18 path | D - direction of draft |
| 19 stalks | B - bed |
| 20 steering means | F - furrow |
| 22 bracket | ** |
| 24 ears or clevis | |
| 26 pin | |
| 28 drag arm | |
| 30 socket | |
| 32 drag | |
| 34 branch | |
| 36 bight | |
| 38 cross bar | |
| 40 set screw | |
| 42 foot | |
| 44 roller chain | |

DESCRIPTION OF THE PREFERRED EMBODIMENTS

Referring to the drawings there may be seen somewhat schematically represented encoder 10 shown attached to tractor 12 which would move in a direction of draft as shown by arrow D. Sensor 16 is connected to rotatable shaft 14 of the encoder. The sensor forms a means for following path 18 in a cultivated field. As seen particularly in FIG. 2, the path in this case would be represented by a row of plants, for example cotton and more exactly two rows of plants. Stalks 19 of the plants in this case would be a structural guide which may be mechanically sensed by the sensor 16.

Schematically shown in FIG. 10 the tractor 12 includes steering means 20 to guide the tractor responsive to its deviation from the path 18. Bracket 22 on the tractor connects the sensor 16 to the bracket by its connection to the shaft 14 of the encoder 10. The encoder and its shaft forms a mounting means for permitting and measuring the horizontal movement of the path to the bracket 22.

As may be seen, the shaft 14 is mounted on an upright axis which is illustrated as being vertical. As may be seen shaft 14 may be rotated within the sensor 10. The sensor contains a mechanism which will measure the rotation of the shaft within the encoder and transmit it so that it may be used by the steering means to guide the tractor responsive to the deviations of the path as measured by the rotation of the shaft 14.

Figure 2:
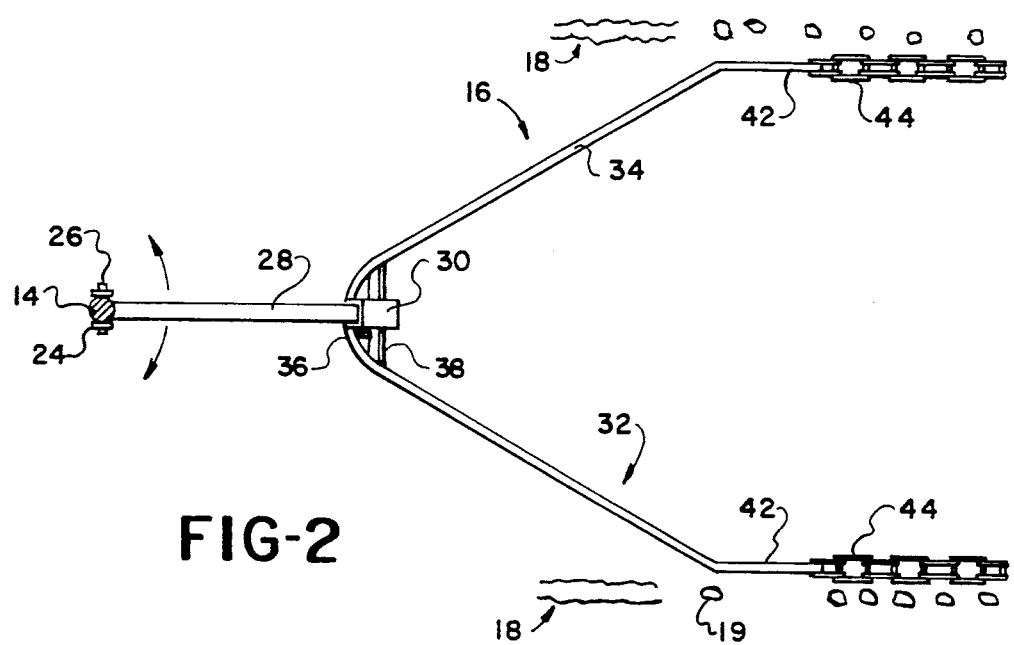
FIG. 2 is a top plan view of the sensor of FIG. 1 which includes the shaft of the encoder.
Figure 3:
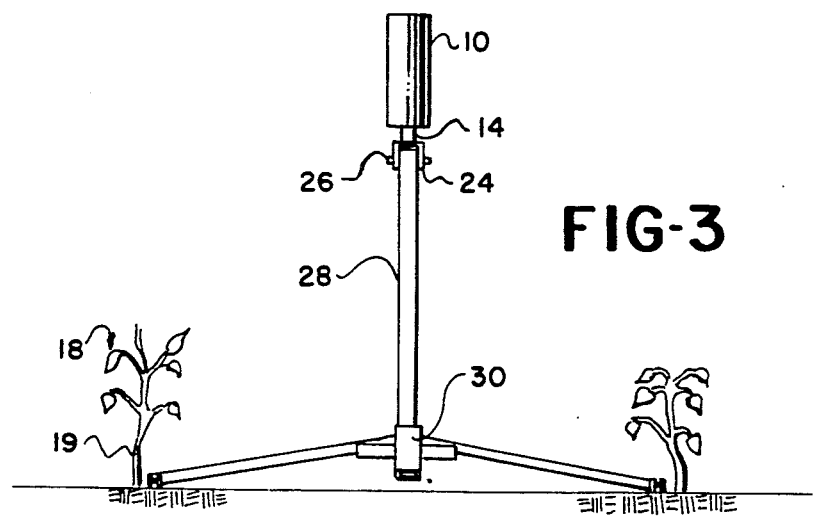
FIG. 3 is a rear elevational view of the sensor of FIG. 1.

The bottom of the shaft has clevis or two depending ears 24. Horizontal pin 26 extends between the two ears and through the top of drag arm 28. Thus it may be seen that the drag arm 28 may ride up or down as shown by arrows adjacent to the drag arm in FIG. 1. Likewise the drag arm may rotate about the axis of the shaft 14 as seen in FIG. 2. The drag arm in the form of square tubing will extend downward and rearward from the pin 26 at approximately a 45 degree angle. Rearward is the direction opposite the direction of draft D.

Socket 30 in the form of square tubing telescopes around the bottom of the drag arm 28 whereby the drag arm 28 is connected to drag 32. The drag 32 includes a forward nose or bight 36 having two branches 34 extending rearwardly and outwardly in V shape from the bight 36. The socket 30 is connected to the bight 36 by crossbar 38. The drag arm 28 is held in the socket 30 by a set screw or bolt 40.

It may be seen that the two rows of growing plants forming the path 18 are approximately 40 inches apart, it will be understood that the distance of the outside of feet 42 will be approximately 39 inches or slightly more so that there is about one-half inch or less between the feet and the stalks 19 of the plants forming the path 18.

Sometimes a branch 34 and its attached foot 42 will be called a "wand". As may be seen the feet are at a slight angle to the branch so that if the feet 42 are level and flat upon the ground that the bight 36 will be approximately four inches above the ground.

The drag 32 in this embodiment is stabilized by a means for stabilizing in the form of a dragstrip preferably roller chain 44. Specifically the roller chain is an ASA No. 50 chain. The drag strip could take other forms, however, as set out above, it is desirable that the drag strip be flexible in the vertical direction and rigid or non-flexible in the horizontal direction. A heavy belt or strap of rubber or fabric reinforced rubber would be suitable. As shown in the drawing, the chain is oriented so that it is flexible in the vertical direction and rigid in the horizontal direction inasmuch as the rollers of the roller chains are mounted about a horizontal axis and connected by the connecting links as shown.

Other means of stabilizing might be coulter plows either in the form of a vertical keel-like knife or a rotating coulter similar to a pizza cutter. The preferred connection of the stabilizer is at the trailing end of the wand which is to say the trailing end of each foot 42. In certain instances the stabilizer could be placed at the bight 36. This would be particularly true if the stabilizer were in the form of a coulter.

If because of cultural practice there were a defined furrow midway between the plants, a dragstrip could be attached to the bight 36.

As seen in FIG. 4, the roller chain having rollers 46 upon pins 48 between the links 50 may be conveniently attached to each foot 42 by welding the links to the rearward portion of the foot.

Referring to FIG. 5, there is illustrated a second embodiment of a sensor 116. The sensor 116 includes a drag arm 128 attached to the shaft 14 of the encoder 10 by the pin 26 through the ears 24. In this case the sensor 116 is basically in the shape of a "J", which is to say that the arm 128 extends downward and rearwardly at about a 45 degree angle and has a bend at its point of contact with the ground so that it forms approximately a 90 degree angle. The lower portion which is likely to contact the ground is covered with tube 130. Suitable tubes might be either natural rubber or synthetic materials such as a small garden hose. However, the preferred material for the tube 130 is PVC (polyvinyl cholride).

The sensor 116 could be stabilized by a drag strip similar to a roller chain.

The sensor as shown in FIGS. 5, 6, and 7, is particularly adaptable to run within a furrow as shown by furrow F between two beds B as seen in FIG. 6. A sensor as seen in FIGS. 5, 6, and 7, is particularly desirable to use if the ground is wet and tends to gather mud upon the sensor. The tubing around the metal drag arm 128 particularly repels the mud and prevents the mud from caking upon the sensor. Therefore, inasmuch as a roller chain might accumulate mud, in this case a drag strip formed of rubber or fabric reinforced rubber would not. Another suitable drag strip is a section of rubber tubing, such as a small garden hose, suitably attached to the terminal end 152 of the sensor.

FIGS. 8 and 9 illustrates a sensor 216 which has been found to work well in deep furrows F between two beds B if the ground is dry. It likewise has a drag arm 228 which extends rearwardly and downward at about a 45 degree angle from an encoder 10. Also, the drag arm 228 is attached by a pin 26 extending through the ears or clevis 24 attached to the bottom end of the shaft 14 of the encoder 10. In this instance a spherical metal ball 232 is the contact element with the ground. We have had good success using a 16 lb. metal ball about 5" in diameter. Such balls to form the drag 232 are readily available in the form of shot put. The spherical metal ball is particularly useful if the furrow F is not particularly clean and well defined. I.e., if there are clods or other debris within the furrow which would deflect a sensor 116 such as is shown in FIG. 5, it has been found that the mass or weight of the shot put will stabilize it. On the other hand, it is evident that there need be a well defined trough or furrow for it to follow, otherwise, also because of its weight, it will crush or not follow a path which does not have structural strength. For example, if the path were such as is shown as path 18 in FIG. 2, i.e., a row of cotton stalks, the mass of the metal ball 232 would not sense the path but would tend to crush the path.

Thus it may be seen that stabilizers, while being extremely important, take different forms for different field conditions. This is another way of saying different stabilizers for different paths.

The embodiments shown and described above are only exemplary. We do not claim to have invented all the parts, elements or steps described. Various modifications can be made in the construction, material, arrangement, and operation, and still be within the scope of our invention.

The restrictive description and drawings of the specific examples above do not point out what an infringement of this patent would be, but are to enable one skilled in the art to make and use the invention. The limits of the invention and the bounds of the patent protection are measured by and defined in the following claims.

We claim:

1. Structure for sensing a path in a cultivated field for a tractor to follow;
   a. said path having at least one structural guide which may be mechanically sensed,
   b. said tractor having,
      i. steering means to guide the tractor responsive to deviations from the path,
      ii. a bracket on the tractor,
      iii. a sensor for contacting said path guide attached to the bracket by
      iv. mounting means for permitting and measuring horizontal movement of the sensor to the bracket;
      v. said sensor comprising a wand assembly having a pair of elongated path sensing legs;
   c. the improved structure comprising in combination with the above:
   d. a stabilizer means including an elongated and vertically flexible drag strip attached to the sensor to drag on the path behind the sensor, e. said drag stip forming stabilizer means for stabilizing and prohibiting bounce of the sensor.

2. The invention as defined in claim 1 wherein:

f. said guide being a pair of rows of stalks, and
g. said sensor is in the form of a rigid drag having
   i. said pair of legs extending parallel to each other between said rows,
   ii. a bight connecting said legs together, and
   iii. a pivot on the forward portion of the bight,
   iv. said bight tapering from said legs to said pivot,
   v. said bight and legs constructed of an unitary elongated material.

3. Structure for sensing a path in a cultivated field for a tractor to follow;

a. said path having at least one structural guide which may be mechanically sensed,
b. said tractor having,
   i. steering means to guide the tractor responsive to deviations from the path,
   ii. a bracket on the tractor,
   iii. a sensor for contacting said path guide attached to the bracket by
   iv. mounting means for permitting and measuring horizontal movement of the sensor to the bracket;
c. the improved structure comprising in combination with the above:
d. stabilizer means connected to said sensor for stabilizing and prohibiting bounce of the sensor,
e. said stabilizer means is in the form of a drag strip on the path, and
f. said strip is flexible vertically but rigid horizontally.

4. The invention as defined in claim 3 wherein
g. said strip is a roller chain.

5. The invention as defined in claim 3 wherein
g. said strip is an ASA #50 roller chain.

6. The invention as defined in claim 3 wherein:
g. said guide being a pair of rows of stalks, and
h. said sensor is in the form of a rigid drag having
   i. two parallel legs between said rows,
   ii. a bight connecting said legs together, and
   iii. a pivot on the forward portion of the bight,
   iv. said bight tapering from said legs to pivot,
   v. said bight and legs constructed of an unitary elongated material.

* * * * *